United States Patent
Heintzelman et al.

[11] Patent Number: 5,988,758
[45] Date of Patent: *Nov. 23, 1999

[54] SEAT BELT RETRACTOR EXIT COVER WITH INTEGRAL ESCUTCHEON

[75] Inventors: Ronald Heintzelman; Steven Richter, both of St. Clair Shores; Michael Haldenwanger, Brighton, all of Mich.

[73] Assignees: Breed Automotive Technology, Inc., Lakeland, Fla.; General Motors Corporation, Detroit, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/853,700

[22] Filed: May 13, 1997

[51] Int. Cl.$^6$ .................................................. B60R 22/00
[52] U.S. Cl. ........................... 297/483; 297/473; 297/476
[58] Field of Search .................................... 297/478, 476, 297/479, 480, 483, 473

[56] References Cited

U.S. PATENT DOCUMENTS

| | | |
|---|---|---|
| 5,411,292 | 5/1995 | Collins et al. ........................ 297/476 X |
| 5,411,319 | 5/1995 | Kuiri . |
| 5,423,598 | 6/1995 | Lane, Jr. et al. . |
| 5,441,332 | 8/1995 | Verellen . |
| 5,452,941 | 9/1995 | Halse et al. . |
| 5,489,072 | 2/1996 | Gordon et al. . |
| 5,495,994 | 3/1996 | Rumpf et al. . |
| 5,511,739 | 4/1996 | Dybro et al. . |
| 5,529,258 | 6/1996 | Dybro et al. . |
| 5,529,259 | 6/1996 | Woydick et al. . |
| 5,533,756 | 7/1996 | Dybro et al. . |
| 5,544,917 | 8/1996 | Loxton et al. ........................ 297/473 X |
| 5,547,143 | 8/1996 | Miller, III et al. . |
| 5,556,171 | 9/1996 | Busch ........................................ 297/483 |
| 5,599,070 | 2/1997 | Pham et al. ............................. 297/483 |
| 5,609,396 | 3/1997 | Loxton et al. ........................ 297/483 X |
| 5,658,051 | 8/1997 | Vega et al. ............................... 297/483 |
| 5,722,732 | 3/1998 | Haldenwanger ........................ 297/483 |

Primary Examiner—Jose V. Chen
Assistant Examiner—Stephen Vu
Attorney, Agent, or Firm—Markell Seitzman

[57] ABSTRACT

A vehicle restraint system with a housing for a seat belt retractor, the housing having a rotatable escutcheon with an exit slot for the seat belt webbing. The escutcheon is preferably mounted to a bearing attached to the housing.

14 Claims, 3 Drawing Sheets

SEAT BELT RETRACTOR EXIT COVER WITH INTEGRAL ESCUTCHEON

BACKGROUND AND SUMMARY OF THE INVENTION

The present invention relates to vehicle restraint systems generally, and more particularly to a seat belt retractor mounted to the interior of an automotive vehicle.

Vehicle seat belt systems are adapted to restrain an occupant of the vehicle in the sudden acceleration or deceleration resulting from an impact. The seat belt retractors, which store the coiled seat belt webbing on a spool, allow the belt webbing to be reeled out for deployment across the occupant of the seat and lock the belt webbing when sudden acceleration or deceleration is detected.

Retractors for shoulder type seat belts are typically mounted to the interior of the car frame or to the seat back. See, e g. U.S. Pat. Nos. 5,495,994, 5,452,941, 5,441,332, 5,423,598, and 5,411,319. The belt webbing is deployed across the shoulder and torso of the occupant with a tongue or latch plate latched to a buckle, typically below the occupant's waist on the inner side of the seat. The angle at which the belt webbing is optimally deployed across the body can vary depending on the size and shape of the occupant, especially for retractors mounted to the seat back.

Accordingly, a way to achieve a variable angle of deployment is to provide a rotatable escutcheon plate with an exit slot for the belt webbing. The exit slot helps prevent twisting of the webbing, and the rotatability of the escutcheon allows the angle of deployment to vary freely according to the direction of pull. The escutcheon can be mounted, for example, to the retractor mechanism or to the seat. However, the rotatable escutcheon can become misaligned from the retractor cover and can cause routing problems, thereby making withdrawal of the webbing more difficult.

It is an object of the present invention, therefore, to provide a seat belt retractor system with a rotatable escutcheon plate having improved alignment and rotation. This is accomplished by mounting the rotatable escutcheon directly to the retractor cover, rather than to the retractor mechanism or to the vehicle seat.

Many other objects and purposes of the invention will be clear from the following detailed description of the drawings.

DETAILED DESCRIPTION OF THE DRAWINGS

Figure 1:
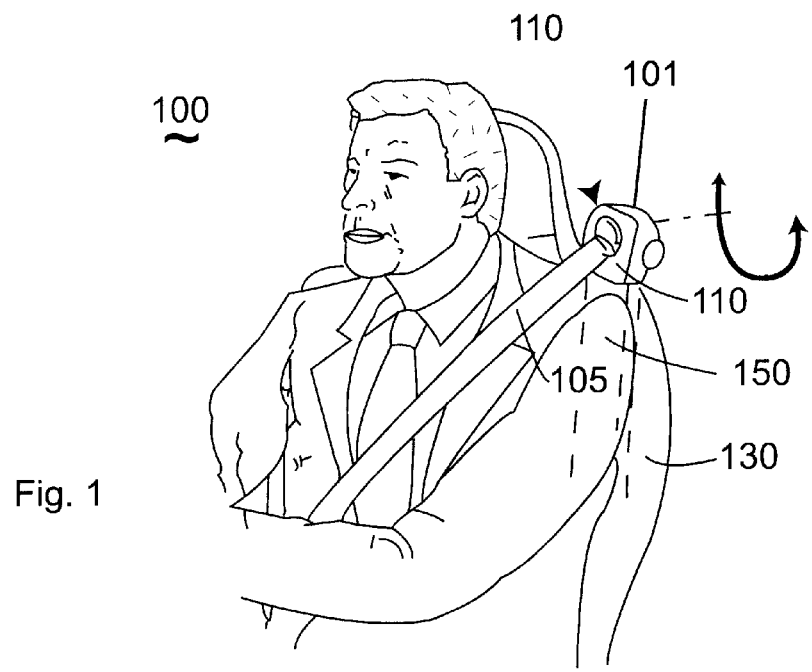
FIG. 1 is a perspective view illustrating use of the seat belt retractor with rotatable escutcheon located within a seat of a motor vehicle.
Figure 2:
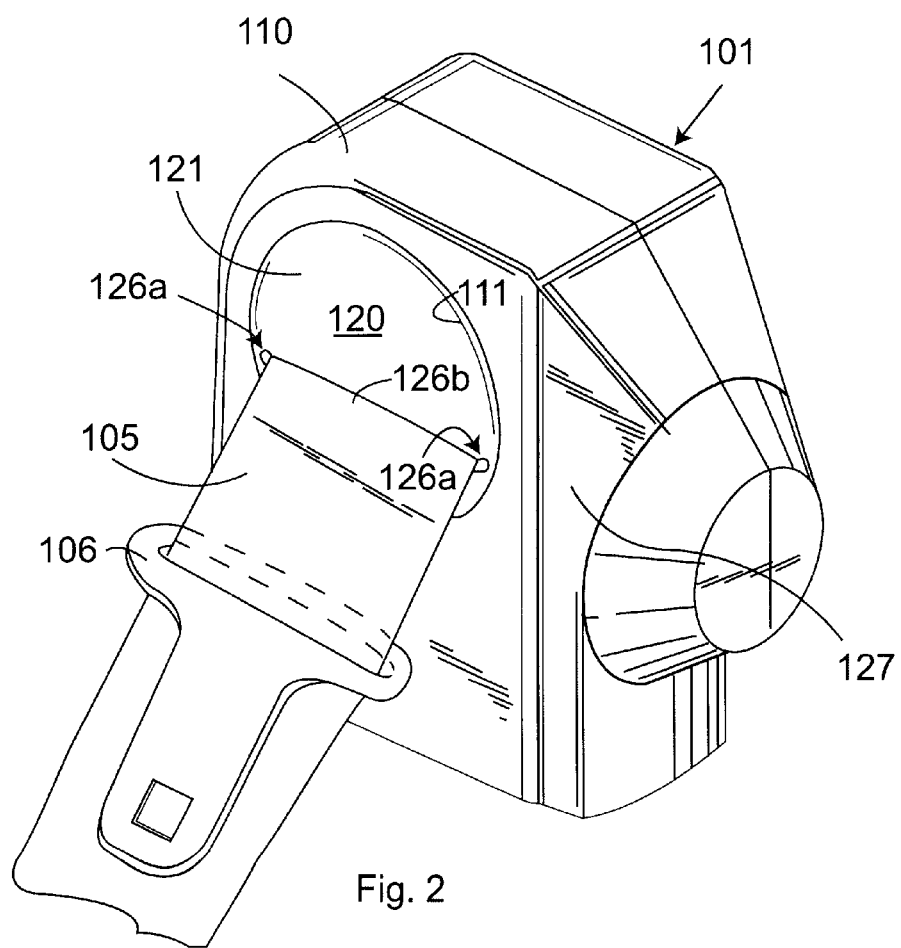
FIG. 2. is an enlarged perspective view of the seat belt retractor with rotatable escutcheon in accordance with one embodiment of the invention.

Referring to FIGS. 1 and 2, the vehicle restraint system 100 includes a support tower 150 situated within a vehicle seat 130, a housing located atop the tower 150, a seat belt retractor 101 for releasably storing a seat belt webbing 105. While not fully illustrated the system is configured as a three-point restraint system having a shoulder belt and lap belt portion to secure the occupant. In the present invention the retractor 101 may be situated within the housing 110 or at the base of the tower 150. If situated within the housing 110 the webbing extends directly thereout. If the retractor is located below the housing, the housing will typically include a roller or diverter 170, attached to the top of the tower (within the housing) capable of absorbing the inertial loading of the occupant. The roller or diverter changes the direction of the webbing so that that it can exit the housing in a desired direction. As is known in the art retractors include a spring biased spool to releasably store a coil of seat belt webbing under tension and web and vehicle (inertia) sensing and locking mechanisms which lock the spool during an accident to prevent protraction of the belt. Retractor mechanisms suitable for use in the vehicle restraint system described herein are known in the art and are disclosed, for example, in the U.S. Pat. Nos. 5,547,143, 5,533,756, 5,529,259, 5,529,258, 5,511,739, and 5,489,072, all of which are herein incorporated by reference. The webbing 105 is attached to a latch plate or tongue 106 which can be grasped by the occupant of the vehicle seat and drawn downward (with shoulder belts) across the occupant's torso (see, FIG. 1) to be engaged with a corresponding buckle mechanism (not shown) on the other side of the seat in a known manner. The sensing and locking mechanisms sense the rate of withdrawal of the webbing or deceleration of the vehicle and in the event of a sudden deceleration, e.g. during an impact lock the webbing. When the buckle is unlatched a rewind spring associated with the spool pulls the webbing back onto the spool.

Figure 3:
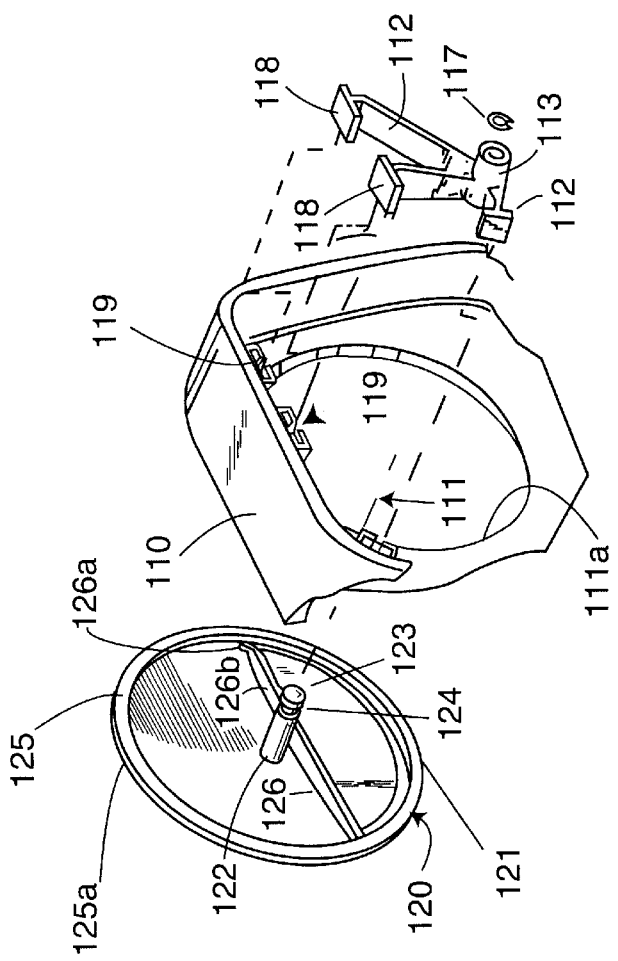
FIG. 3 is an exploded perspective view of the escutcheon and housing of FIG. 2.
Figure 4:
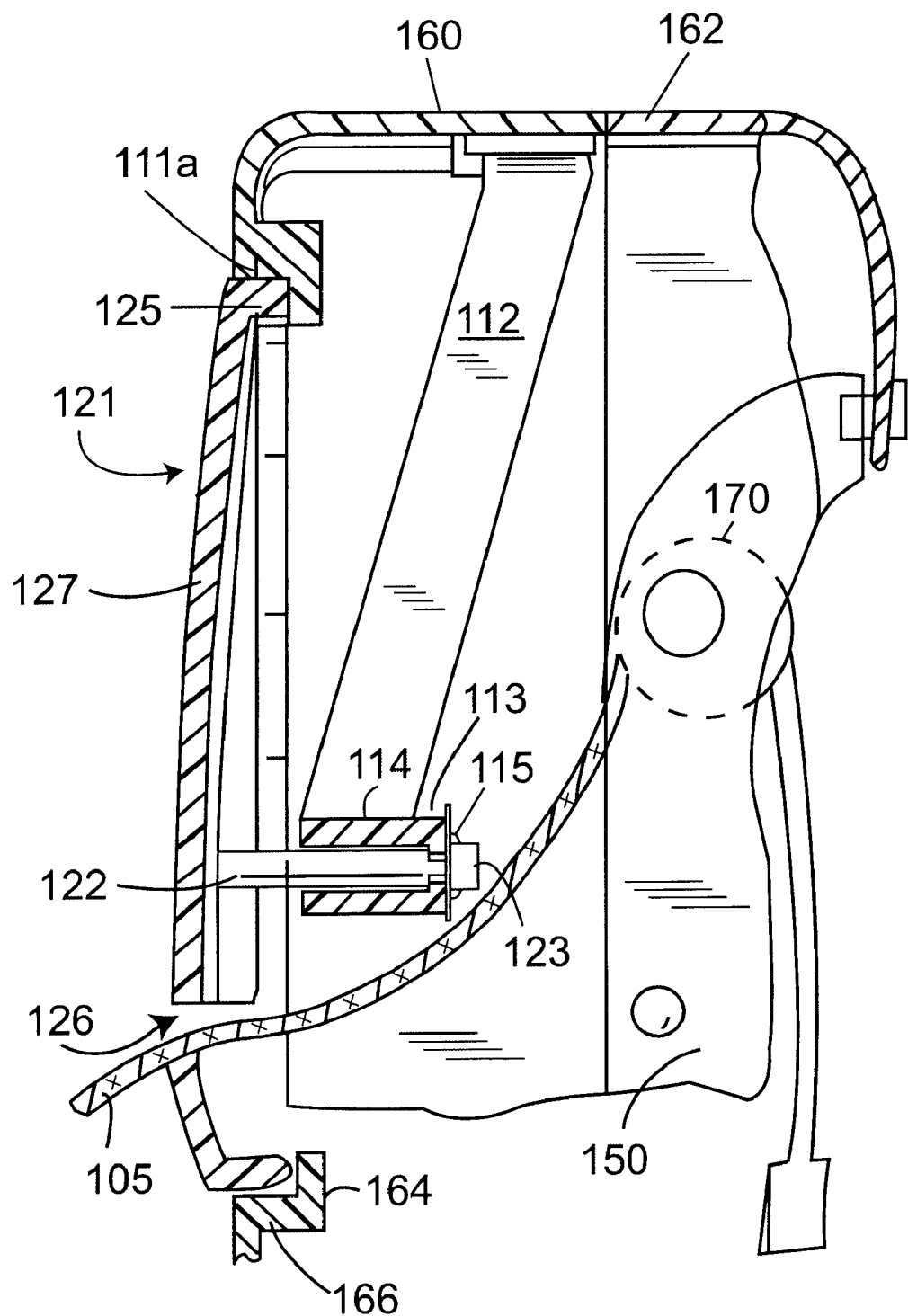
FIG. 4 is a sectional side view of the escutcheon and housing of FIG. 2.

Referring now to FIGS. 2–4 housing 110 is attached to tower 150 which may be an integral part of the seat frame or a separate structure attached to the seat frame. The housing at least partially encloses the seat belt retractor mechanism or roller and is located therein. The housing includes a front portion 160 and a mating rear portion 162. While not illustrated the rear portion is attached to the top of the tower 150. A rotatable escutcheon 120 is positioned at the circular aperture 111 on the front housing portion 160. Escutcheon 120 includes a rotatably mounted disk shaped circular face plate 121, and a shaft 122 projecting axially from the center of face plate 121 and terminating in a proximal free end 123. A circumferential groove 124 extends around shaft 122 in proximity to free end 123. Optionally, shaft 122 and face plate 121 can be monolithically formed and can be fabricated from metals, such as aluminum or steel, or plastics, such as polycarbonate, acrylics (such as polymethyl methacrylate), acetal, nylon, or polyesters, for example.

Face plate 121 includes a web exit slot 126 extending partially across the face plate 121, the slot 126 being spaced apart from the axial center point of the face plate. Optionally, slot 126 can have curled ends 126a, although slot 126 preferably has a substantially rectilinear main portion 126b. The seat belt webbing 105 is disposed through slot 126, which forms the exit opening for the webbing 105.

Face plate 121 preferably includes an annular flange 125 extending rearwardly behind the front surface 127 of face plate 121. The housing 110 includes an inward, circular flange 164 defining opening 111 and a circular shoulder 166 which provides a circular support wall. The diameter of the face plate 121 at the outer edge 125a of flange 125 is chosen to permit the face plate to be loosely received relative to edge 111a of the opening 111.

Figure 5:
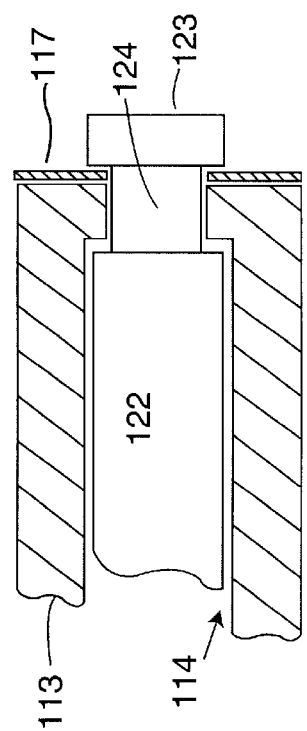
FIG. 5 is a sectional side view of the escutcheon shaft disposed within the cylindrical bearing.

Referring also now to FIG. 5, the escutcheon 120 is preferably rotatably connected to the housing 110. Support struts 112 in the interior of the housing support a cylindrical bearing 113 which has an axial bore 114. While the struts are shown separate from the front housing portion they can be molded as an integral, depending part of the front housing portion 160. At the proximal end of axial bore 114, an annular lip 115 projects inwardly to engage circumferential groove 124 of the escutcheon shaft. Lip 115 and groove 124 form a rotatable snap fit engagement means for the shaft 122 to be inserted into bearing 113. Optionally, a retainer ring 117 can be positioned in the groove 124 for further retention.

The bearing can be lined with low friction material, for example polytetrafluoroethylene (PTFE). Other methods of lubrication can alternatively be used. The housing 110 can be fabricated from durable engineering plastics such as polycarbonate, acetal, acrylics, nylon, and polyesters, or from metals such as aluminum or steel. The struts 112 and bearing 113 can be integrally constructed with the housing for example by injection molding, stamping, or other suitable methods of fabrication. Alternatively, the struts 112 can each have a plate 118 forming a T-shaped structure at the end of the strut for engagement in a corresponding slot 119 in the housing.

Although the escutcheon can be mounted to the retractor mechanism 101 or the seat tower 150, the configuration described herein with the escutcheon 120 mounted to the housing 110 reduces the likelihood of misalignment and consequent webbing routing problems. The rotatability of the escutcheon enables the belt webbing to be withdrawn at an optimum angle of pull with respect to the occupant, which helps to prevent twisting of the belt webbing. Further, the rotatable escutcheon permits the webbing to easily conform to the occupant's torso to facilitate angular placement thereacross.

Many changes and modifications in the above described embodiments of the invention can be carried out without departing from the scope thereof. Accordingly, that scope is intended to be limited only by the scope of the appended claims.

We claim:

1. A vehicle restraint system comprising:
   a) a seat belt retractor for releasably storing a seat belt webbing;
   b) a seat belt webbing releasably stored in said seat belt retractor;
   c) a housing through which the webbing extends;
   d) an escutcheon rotatably mounted to the housing, said escutcheon having a slot through which the seat belt webbing is disposed, wherein the escutcheon includes a circular face plate with a shaft projecting axially therefrom, the shaft having a free end, and further including an opposite end in direct relationship contact with the face plate.

2. A vehicle restraint system comprising:
   a) a seat belt retractor for releasably storing a seat belt webbing;
   b) a seat belt webbing releasably stored in said seat belt retractor;
   c) a housing through which the webbing extends;
   d) an escutcheon rotatable mounted to the housing, said escutcheon having a slot through which the seat belt webbing is disposed,
      wherein the housing includes a plurality of support struts connected to a bearing having an axial bore, and
      an escutcheon shaft rotatably disposed within said axial bore.

3. The vehicle restraint system of claim 2 further including snap fit means for snap fit engagement of the escutcheon shaft with the bearing.

4. The vehicle restraint system of claim 3 wherein the snap fit means includes a circumferential groove disposed on the shaft in a vicinity of the free end thereof, and an annular lip portion disposed at one end of the axial bore of the bearing, the annular lip portion being received into the circumferential groove.

5. The vehicle restraint system of claim 2 wherein the housing includes a circular aperture.

6. The vehicle restraint system of claim 5 wherein the escutcheon is mounted within the circular aperture of the housing.

7. The vehicle restraint system of claim 6 wherein the escutcheon has a recessed annular flange portion having a diameter smaller than the diameter of the circular aperture of the housing.

8. The vehicle restraint system of claim 2 wherein the housing is fabricated from a material selected from the group consisting of polycarbonate, acetals, acrylic polymers, nylon, polyesters, aluminum, and steel.

9. The vehicle restraint system of claim 2 wherein the axial bore of the bearing is lined with a low friction material.

10. The vehicle restraint system of claim 9 wherein the low friction material comprises polytetrafluoroethylene.

11. The vehicle restraint system of claim 2 wherein said support struts are integrally fabricated within the housing.

12. The vehicle restraint system of claim 2 wherein the support struts are removably connected to the housing.

13. The vehicle restraint system of claim 12 wherein each of said support struts includes a plate forming a T-shaped end structure which is insertable into corresponding slots in the housing.

14. The vehicle restraint system of claim 2 wherein the escutcheon includes a circular face plate and wherein the shaft projects axially therefrom, the shaft having a free end.

* * * * *